US012744872B2

(12) United States Patent
Berger et al.

(10) Patent No.: US 12,744,872 B2
(45) Date of Patent: Sep. 22, 2026

(54) EXPANDED FIELD OF VIEW USING MULTIPLE CAMERAS

(71) Applicant: Apple Inc., Cupertino, CA (US)

(72) Inventors: Kai Berger, San Jose, CA (US); Dan C Lelescu, Morgan Hill, CA (US); Tobias Rick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 18/691,424

(22) PCT Filed: Sep. 22, 2022

(86) PCT No.: PCT/US2022/044460
§ 371 (c)(1),
(2) Date: Mar. 12, 2024

(87) PCT Pub. No.: WO2023/049304
PCT Pub. Date: Mar. 30, 2023

(65) Prior Publication Data

US 2024/0397025 A1 Nov. 28, 2024

Related U.S. Application Data

(60) Provisional application No. 63/248,405, filed on Sep. 24, 2021.

(51) Int. Cl.
*H04N 13/128* (2018.01)
*G06T 5/70* (2024.01)
(Continued)

(52) U.S. Cl.
CPC ............ *H04N 13/128* (2018.05); *G06T 5/70* (2024.01); *G06T 5/77* (2024.01); *G06T 7/593* (2017.01);
(Continued)

(58) Field of Classification Search
CPC ........ G06F 3/011; G06F 3/0304; G06F 3/017; G06F 1/1686; G06F 3/04845;
(Continued)

(56) References Cited

U.S. PATENT DOCUMENTS

| | | | |
|---|---|---|---|
| 5,768,404 | A | 6/1998 | Morimura et al. |
| 11,127,148 | B1 | 9/2021 | Edmonds et al. |

(Continued)

OTHER PUBLICATIONS

International Search Report and Written Report from PCT/US2022/044460, Date of mailing Jan. 5, 2023, pp. 1-12.

*Primary Examiner* — Alex Kok S Liew
(74) *Attorney, Agent, or Firm* — Robert C. Kowert; Kowert, Hood, Munyon, Rankin & Goetzel, P.C.

(57) ABSTRACT

Methods and apparatus for providing an expanded field of view (FoV) using multiple cameras of a device. A device may include front-facing cameras that capture views of an environment, as well as side cameras that capture wider-angle views. Images from the front and side cameras may be processed to provide a stereo view of the environment with an expanded FoV. Images from the front cameras are processed to provide stereo images, and depth information is generated from the stereo images. The depth information is expanded into a second layer, and a median depth is set for a third layer. The side camera images are undistorted, pixel information from the side camera images is then reprojected into the second and third layers, and the second and third layers are blurred.

20 Claims, 7 Drawing Sheets

(51) Int. Cl.
*G06T 5/77* (2024.01)
*G06T 7/593* (2017.01)
*H04N 13/239* (2018.01)
*H04N 13/344* (2018.01)

(52) U.S. Cl.
CPC ......... *H04N 13/239* (2018.05); *H04N 13/344* (2018.05)

(58) Field of Classification Search
CPC .... G06F 3/048; G06F 3/04815; G06F 3/0482; G06F 3/0484; G06F 3/0428; G06F 3/013; G06F 3/005; G06F 18/22; G06F 1/163; G06F 2203/04108; G06F 3/00; G06F 3/01; G06F 3/033; G06F 3/04842; G06F 3/012; G06F 3/0488; G06F 3/038; G06T 19/006; G06T 2200/24; G06T 19/20; G06T 7/62; G06T 7/13; G06T 2219/2004; G06T 7/55; G06T 13/00; G06T 2219/004; G06T 7/70; G06T 7/593; G06V 20/20; G06V 20/10; G06V 10/443; G06V 10/462; G06V 10/761; G06V 10/467; G06V 20/58
See application file for complete search history.

(56) References Cited

U.S. PATENT DOCUMENTS

| | | | | |
|---|---|---|---|---|
| 11,393,114 | B1 * | 7/2022 | Ebrahimi Afrouzi .. | G01C 11/02 |
| 2012/0206452 | A1 * | 8/2012 | Geisner .................. | G06F 3/013<br>345/419 |
| 2013/0114887 | A1 * | 5/2013 | Nanri ........................ | G06T 5/73<br>382/154 |
| 2015/0296319 | A1 * | 10/2015 | Shenoy .................. | H04R 3/005<br>381/303 |
| 2019/0320164 | A1 | 10/2019 | Salahieh et al. | |
| 2020/0134849 | A1 * | 4/2020 | Blasco Claret ......... | G06T 7/579 |

* cited by examiner

EXPANDED FIELD OF VIEW USING MULTIPLE CAMERAS

PRIORITY APPLICATIONS

This application is a 371 of PCT Application No. PCT/US2022/044460, filed Sep. 22, 2022, which claims benefit of priority to U.S. Provisional Patent Application No. 63/248,405, filed Sep. 24, 2021. The above applications are incorporated herein by their reference. To the extent that any material in the incorporated application conflicts with material expressly set forth herein, the material expressly set forth herein controls.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

Some devices may include forward-facing cameras that capture images or video of an environment in front of the device. These images or video streams may be combined and rendered to provide a stereo view of the environment through a display. However, the field of view (FoV) of these systems is limited to the FoV of the forward-facing cameras.

SUMMARY

Embodiments of methods and apparatus for providing an expanded field of view (FoV) using multiple cameras of a device or system are described. A device may include forward-facing cameras that capture images or video of an environment in front of the device. These images or video streams may be combined and rendered to provide a stereo view of the environment through a display. However, the field of view (FoV) of these systems is limited to the FoV of the forward-facing cameras. Embodiments may use input from one or more other cameras of the device or system to expand the FoV of the forward-facing cameras of a device or system. These other cameras may be referred to as side cameras, while the forward-facing cameras may be referred to as front cameras. Typically, these side cameras have a wide FoV, and may include or be what are known as "fisheye" cameras or near so. The FoVs of the side cameras generally overlap somewhat with the FoV of the front cameras. Embodiments may leverage the input from these side cameras to provide an expanded FoV that may be displayed to the user of the device.

In embodiments, to provide the expanded FOV stereo images for display, images from the two front cameras are at least initially processed as normal to provide stereo images. Depth information is generated from the two front camera images. This depth information may be sparse or "wireframe" depth information in some embodiments that more or less just captures or represents edges in the image. However, some embodiments may leverage depth technology of the device to generate a denser, less sparse depth map for the stereo images. The depth information generated from the front camera images is then extended for some distance up, down, and/or to the side of the images. Note that this may be done independently for the left and right images, and that the distance extended in the three directions may be the same or may differ. The extended distance(s) may be preset, or may be dynamically determined based on one or more factors. Assuming the stereo images captured by the front cameras as a first layer or image plane of the expanded FoV stereo images that are being generated, this first extension creates a second layer or image plane around at least a portion of the stereo images. Note that in some embodiments, the depth information generated from the stereo images may be sparse "wireframe" depth information, and thus the depth information may be sparse in the second layer. A third layer or image plane is then generated by extending outward from the outer edge of the second layer for a second distance. In at least some embodiments, a "flat" depth value (which may, for example, be a median depth determined from the generated depth information) is set for the third layer.

In some embodiments, to provide "flatter" images for the expanded FoV processing, the side camera images may be "undistorted" to somewhat flatten the images so that depth and geometry of objects in the images more closely corresponds to depth and geometry of objects in the stereo images generated from the front camera input.

Pixel information (color, texture, etc.) from the side camera images may then be reprojected to respective pixels in the second and third layers. The three layers may then be merged. In some embodiments, at least the second layer is blurred either before or after the three layers are merged; the first layer (the original stereo images) is not blurred.

This method may be applied independently to the left and right sides of the stereo images to generate the expanded FoV stereo images that can then be provided to a display of the device for display to the user. The resulting image that is displayed is "foveated"; the stereo images (first layer) provide a central sharp region of the image of the environment to the user; the second layer provides a blurred region at extended and varying depth from the stereo images as a transition from the stereo images to the third layer; and the third layer provides a peripheral region at a flat depth. In addition, instead of just filling in a peripheral region around the stereo images with ambient content or colors as has conventionally been done to extend stereo images, by projecting the content of actual images captured by the side cameras, embodiments extend the scene in the stereo images of the first layer into the extended region created by the second and third layers. Pixels from the side camera images are reprojected into the extended region around the in-focus stereo images using a method that fills the extended region with actual scene content at close to correct depth and position, with the extended region slightly burred or defocused.

By extending depth information into the expanded region as described herein, embodiments essentially place an image plane within the scene, and image data from the side cameras is reprojected to that image plane. The image plane acts as a proxy for the scene, and the described operations are performed at that image plane. Thus, embodiments act as a virtual camera with a shallow DoF. Only the portions of the scene captured by the side cameras that are actually on that image plane are in focus from the virtual viewpoint. This is similar to a shallow DoF optical blur.

By extending the scene into the extended region around the stereo images using the methods described above, embodiments may increase the immersiveness of the XR experience by providing a scene-connected, ambient expansion of the FoV, which may provide a more natural view of the environment through the display of a device such as a head-mounted device (HMD of an XR system than conventional methods. The displayed scene with the focused central region provided by the front camera stereo images surrounded by the extended portion of the scene that is rendered slightly out of focus from images provided by the side cameras may more closely approximate normal human vision than conventional methods.

Figure 1A:
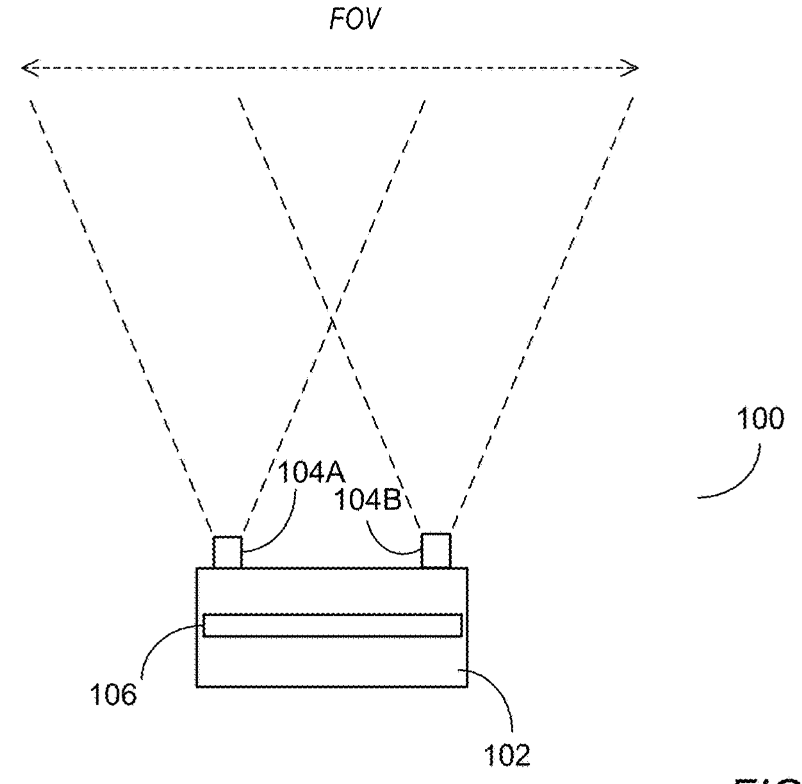
FIG. 1A illustrates a device that includes forward-facing cameras with a limited field of view (FoV), according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing an expanded field of view (FoV) using multiple cameras of a device or system are described. Some devices may include forward-facing cameras that capture images or video of an environment in front of the device. These images or video streams may be combined and rendered to provide a stereo view of the environment through a display. However, the field of view (FoV) of these systems is limited to the FoV of the forward-facing cameras. Embodiments may use input from one or more other cameras of the device or system to expand the FoV of the forward-facing cameras of a device or system. These other cameras may be referred to as side cameras, while the forward-facing cameras may be referred to as front cameras.

As an example, a device such as a head-mounted device (HMD) used in an extended reality (XR) system may have front cameras that capture video or images of an environment in front of the device. Typically, these images from the two (or more) front cameras are processed and used to generate stereo views that are displayed to a user of the device as a stereo image. However, the FoV of the image is limited by the FoV of the front cameras.

In some such devices, there may be one or more cameras located on one or both sides of the device that are conventionally used for other purposes, for example for location purposes in an environment in which a user is wearing the device. Typically, these side cameras have a wide FoV, and may include or be what are known as "fisheye" cameras or near so. The FoVs of the side cameras generally overlap somewhat with the FoV of the front cameras. Embodiments may leverage the input from these side cameras to provide an expanded FoV that may be displayed to the user of the device.

To generate the expanded FoV stereo images for display, embodiments may capture and process images captured by the front and side cameras at or at nearly the same time in a processing pipeline. For the sake of discussion, two front cameras are assumed, and two side cameras (one on each side) are assumed. However, there may be more or fewer front cameras, more side cameras, or side cameras only on one side of the device, in some embodiments. Images from the front and side cameras may at least partially be processed in parallel. In addition, images from left side cameras and from right side cameras may be processed at least partially in parallel.

In at least some embodiments of the processing method, images from the two front cameras are at least initially processed as normal to provide stereo images. Depth information is generated from the two front camera images. This depth information may be sparse or "wireframe" depth information in some embodiments that more or less just captures or represents edges in the image. However, some embodiments may leverage depth technology of the device to generate a denser, less sparse depth map for the stereo images.

The depth information generated from the front camera images is then extended for some distance up, down, and/or to the side of the images. Note that this may be done independently for the left and right images, and that the distance extended in the three directions may be the same or may differ. The extended distance(s) may be preset, or may be dynamically determined based on one or more factors. Assuming the stereo images captured by the front cameras as a first layer or image plane of the expanded FoV stereo images that are being generated, this first extension creates a second layer or image plane around at least a portion of the stereo images. Note that in some embodiments, the depth information generated from the stereo images may be sparse "wireframe" depth information, and thus the depth information may be sparse in the second layer.

A third layer or image plane is then generated by extending outward from the outer edge of the second layer for a second distance. In at least some embodiments, a "flat" depth value (which may, for example, be a median depth determined from the generated depth information) is set for the third layer.

As mentioned, the images captured by the side cameras may be wide FoV images with significant "fisheye" distortion. Therefore, in some embodiments, to provide "flatter" images for the expanded FoV processing, the side camera images may be "undistorted" to somewhat flatten the images so that depth and geometry of objects in the images more closely corresponds to depth and geometry of objects in the stereo images generated from the front camera input.

The relative position of the side cameras with respect to the front cameras may be known, or may be determined using an image processing technique that compares the side camera images to the front camera images. Using this position information, pixel information (color, texture, etc.) from the side camera images may then be reprojected to respective pixels in the second and third layers. The three layers may then be merged. In some embodiments, at least the second layer is blurred either before or after the three layers are merged; the first layer (the stereo images) is not blurred.

This method may be applied independently to the left and right sides of the stereo images to generate the expanded FoV stereo images that can then be provided to a display of the device for display to the user. The resulting image that is displayed is "foveated"; the stereo images (first layer) provide a central sharp region of the image of the environment to the user; the second layer provides a blurred region at extended and varying depth from the stereo images as a transition from the stereo images to the third layer; and the third layer provides a peripheral region at a flat depth. In addition, instead of just filling in a peripheral region around the stereo images with ambient content or colors as has conventionally been done to extend stereo images, by projecting the content of actual images captured by the side cameras, embodiments extend the scene in the stereo images of the first layer into the extended region created by the second and third layers. Pixels from the side camera images are reprojected into the extended region around the in-focus stereo images using a method that fills the extended region with actual scene content at close to correct depth and position, with the extended region slightly burred or defocused.

By extending depth information into the expanded region as described herein, embodiments essentially place an image plane within the scene, and image data from the side cameras is reprojected to that image plane. The image plane acts as a proxy for the scene, and the described operations are performed at that image plane. Thus, embodiments act as a virtual camera with a shallow DoF. Only the portions of the scene captured by the side cameras that are actually on that image plane are in focus from the virtual viewpoint. This is similar to a shallow DoF optical blur.

By extending the scene into the extended region around the stereo images using the methods described above, embodiments may increase the immersiveness of the XR experience by providing a scene-connected, ambient expansion of the FoV, which may provide a more natural view of the environment through the display of a device such as a head-mounted device (HMD of an XR system. The displayed scene with the focused central region provided by the front camera stereo images surrounded by the extended portion of the scene that is rendered slightly out of focus from images provided by the side cameras may more closely approximate normal human vision than conventional methods.

In some embodiments, the side cameras may be grayscale cameras, and thus the extended region may be grayscale. However, in some embodiments, assuming the front cameras are color (RGB) cameras, color may be extended at least partially from the original stereo images into the extended region. Other methods to colorize the extended region may be used in some embodiments. However, in some embodiments, at least some of the side cameras may be color cameras, and thus the extended region may at least partially contain color from the side camera images.

While embodiments are generally described in relation to a head-mounted device (HMD) in an XR system that includes two front-facing cameras and on or more cameras on each side, embodiments of these methods may be applied in other types of devices and systems, including but not limited to desktop computers, laptops, mobile devices such as tablets, pads, and smartphones, and drones. Further, the side cameras may be or may include cameras that are not integrated in the device.

While embodiments are generally described in systems that include two front-facing cameras and on or more cameras on each side to generate stereo images with expanded FoV, embodiments of the methods described herein may also be applied in systems that include only one front-facing camera and one or more side-facing cameras to expand the FoV of images captured by the front-facing camera.

FIG. 1A illustrates a device that includes forward-facing cameras with a limited field of view (FoV), according to some embodiments. A device 100 may include forward-facing (front) cameras 104A and 104B that capture images or video of an environment in front of the device 100. These images or video streams may be rendered to provide a stereo view of the environment through a display 106. However, the field of view (FoV) of the displayed stereo view is limited to the FoV of the front cameras 104A and 104B.

Figure 1B:
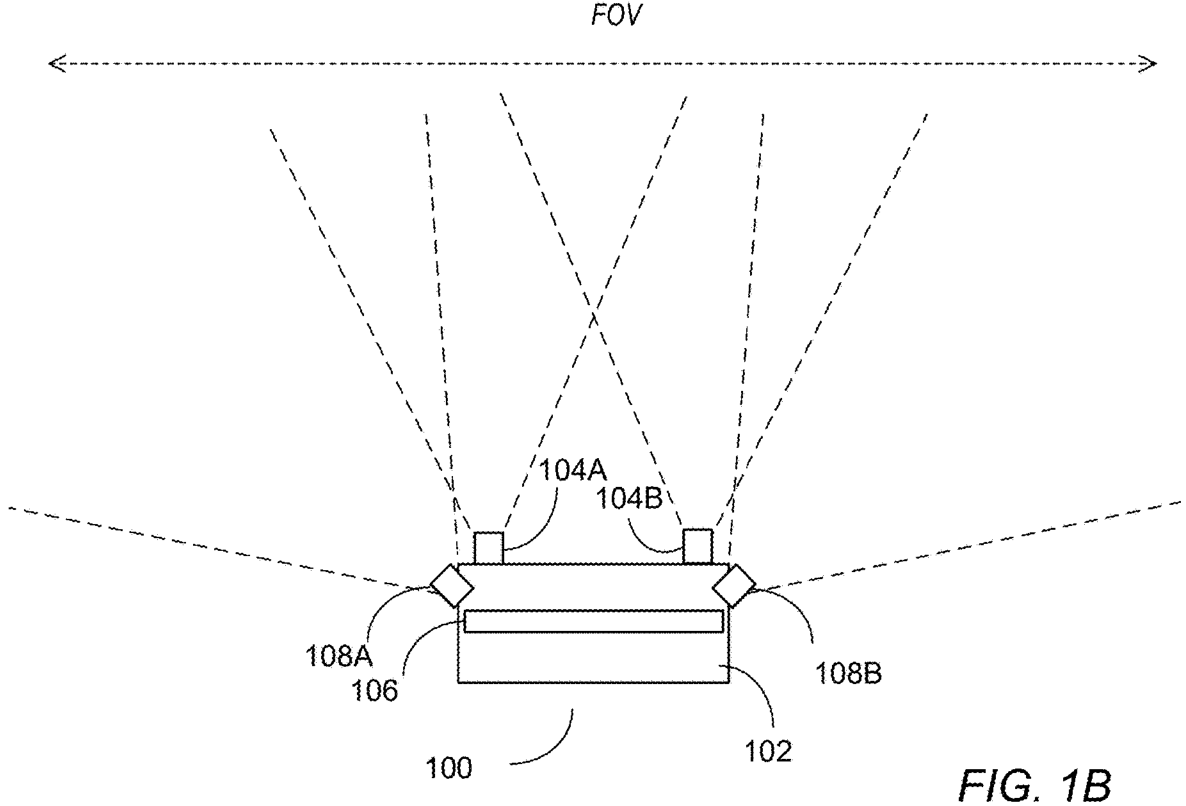
FIG. 1B illustrates a device that includes forward-facing cameras and one or more other cameras that may be leveraged to provide an expanded FoV, according to some embodiments.

FIG. 1B illustrates a device that includes forward-facing cameras and one or more other cameras that may be leveraged to provide an expanded FoV, according to some embodiments. In addition to front cameras 104A and 104B, device 100 may include side cameras 108A and 108B. While one side camera 108 is shown on each side of the device 100, in some devices there may be more than one side camera 108 on each side. Further, a camera 108 may be located elsewhere on the device, for example on the top or bottom rather than on the side of the device 100. In some embodiments, one or more cameras 108 that are not necessarily integrated in the device may be used. Cameras 108 may be configured for use in some function of the device 100 or system; for example images captured by cameras may be used in a localization technique that determines position of device 100 with relation to objects and surfaces in the environment. In some embodiments, a camera 108 may have a wider FoV than a front camera 104, and may be or be close to a "fisheye" camera, and thus images captured by a camera 108 may have radial distortion. Front cameras 104 are typically color (RGB) cameras. Side cameras 108 may be grayscale cameras or color cameras, depending on the device 100. Any of various types of digital camera technologies may be used for front cameras 104 and for side cameras 108, and the camera technology used for side cameras 108 may or may not be the same as that used for front cameras 104.

Images or video of an environment in front of the device 100 captured by the front cameras 104 may be combined and rendered to generate a stereo view of the environment. However, the field of view (FoV) of the stereo view is limited to the combined FoV of the front cameras 104A and 104B.

In embodiments, images captured by the side cameras 108A and 108B may be leveraged to expand the FoV of the scene displayed to the user via display 106. In some embodiments, to expand the FoV of camera 104A, an undistortion technique is applied to an image captured by side camera 108A to remove at least part of the radial distortion of the image, essentially "flattening" the image so that the image is closer to the plane of the image captured by camera 104A. At least a sparse depth map is generated from the front camera 104 images and/or from depth information determined from depth sensing technology of the device 100. A second layer is created by extending the generated depth information out for a first distance from one or more edges of the image captured by camera 104A. A third layer is created by determining a median depth from the image information and extending the median depth out for a second distance. The image captured by camera 108A is aligned with the image captured by camera 104A, for example using known position of camera 108A with respect to camera 104A. Pixel data from the undistorted image from camera 108A is then reprojected into the second and third layers. In some embodiments, a blurring technique may be applied to the extended region so that it is rendered slightly out-of-focus. In some embodiments, if the image captured by camera 108A is a grayscale image, color may be extended at least partially outward from the image captured by camera 104A. This method may also be applied to the images captured by cameras 104B and 108B, and the resulting expanded images may be provided to display 106 as an expanded stereo image. If there is more than one side camera 108 on a side, respective portions of the images from the multiple side cameras 108 may be used to fill respective portions of the expanded region of the second and third layers.

Figure 2:
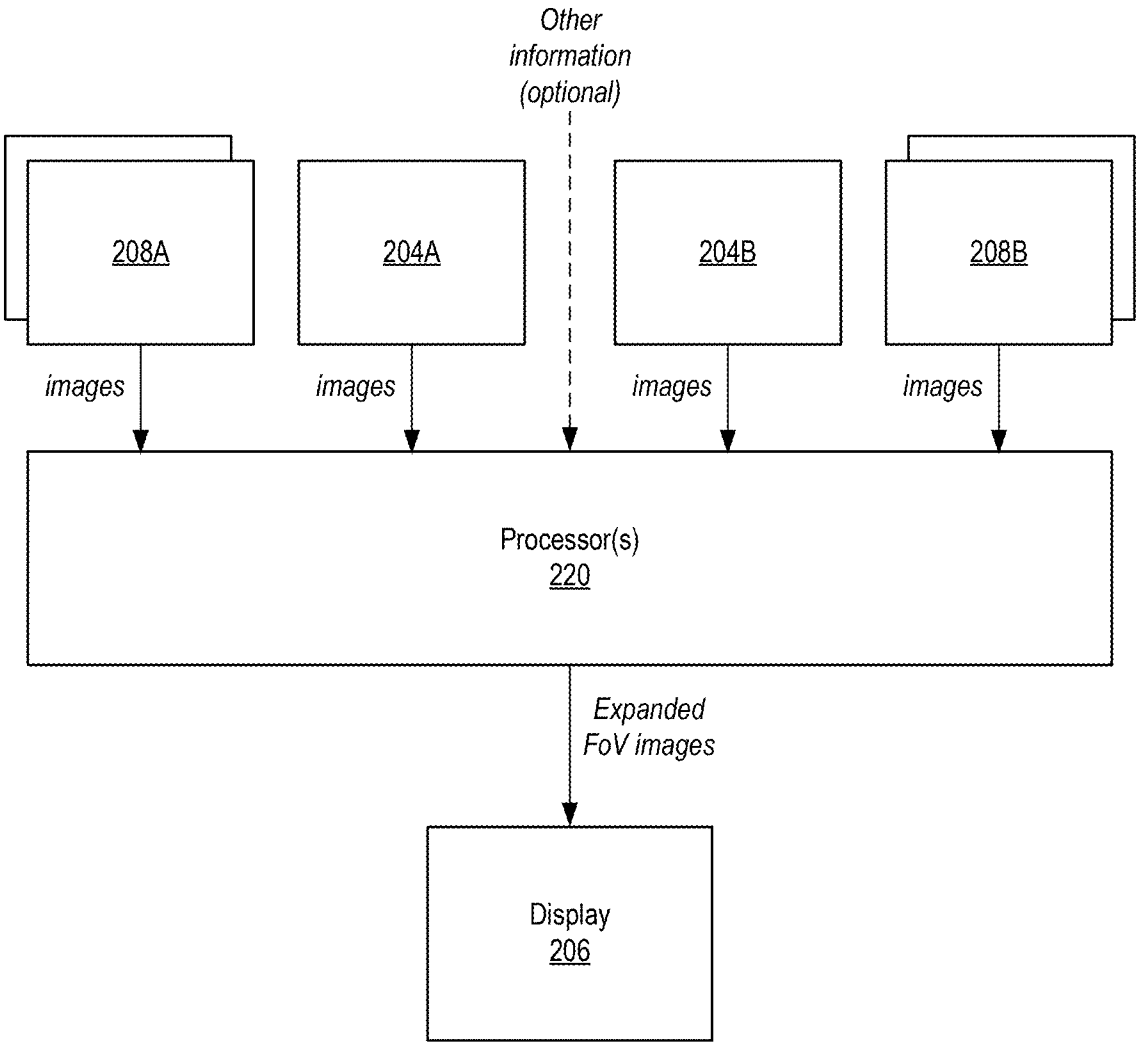
FIG. 2 is a high-level block diagram of a system for providing an expanded FoV using multiple cameras of a device, according to some embodiments.

FIG. 2 is a high-level block diagram of a system for providing an expanded FoV using multiple cameras of a device, according to some embodiments. A device as illustrated in FIG. 1B may include or be coupled to one or more processors 220. The processors 220 may be components of a controller of a device 100, or may be at least in part components of an external device. Processors 220 may include one or more of various types of processors, image signal processors (ISPs), graphics processing units (GPUs), coder/decoders (codecs), system on a chip (SOC), CPUs, and/or other components, and may be coupled to or include memory. Images captured by front cameras 104A and 104B and images captured by side cameras 108A and 108B are input to the processors 220. Other information such as depth data from depth sensing technology of the device 100 may also be input to processors 220.

Processors 220 may perform one or more methods to expand the FoV of the stereo images captured by front cameras 204A and 204B. These methods may be implemented in software and/or hardware, and may be executed at least partially in parallel. To expand the FoV of camera 204A, an undistortion technique is applied to an image captured by side camera 208A to remove at least part of the radial distortion of the image, essentially "flattening" the image so that the image is closer to the plane of the image captured by camera 204A. At least a sparse depth map is generated from the front camera 204 images and/or from depth information determined from depth sensing technology of the device 100. A second layer is created by extending the generated depth information out for a first distance from one or more edges of the image captured by camera 204A. The first distance may be preset or may be dynamically determined based on the content of the image captured by camera 204A. A third layer is created by determining a median depth from the image information and extending the median depth out for a second distance. The second distance may be preset or may be dynamically determined based on the content of the image captured by camera 204A. The image captured by camera 208A is aligned with the image captured by camera 204A, for example using known position of camera 208A with respect to camera 204A, or alternatively using content of the two images. Pixel data from the undistorted image from camera 208A is then reprojected into the second and third layers. In some embodiments, a blurring technique may be applied to the extended region so that it is rendered slightly out-of-focus. In some embodiments, if the image captured by camera 208A is a grayscale image, color may be extended at least partially outward from the image captured by camera 204A. This method may also be applied to the images captured by cameras 204B and 208B, and the resulting expanded images may be provided to a display 106 as an expanded stereo image. If there is more than one side camera 208 on a side, respective portions of the images from the multiple side cameras 208 may be used to fill respective portions of the expanded region of the second and third layers.

Figure 3:
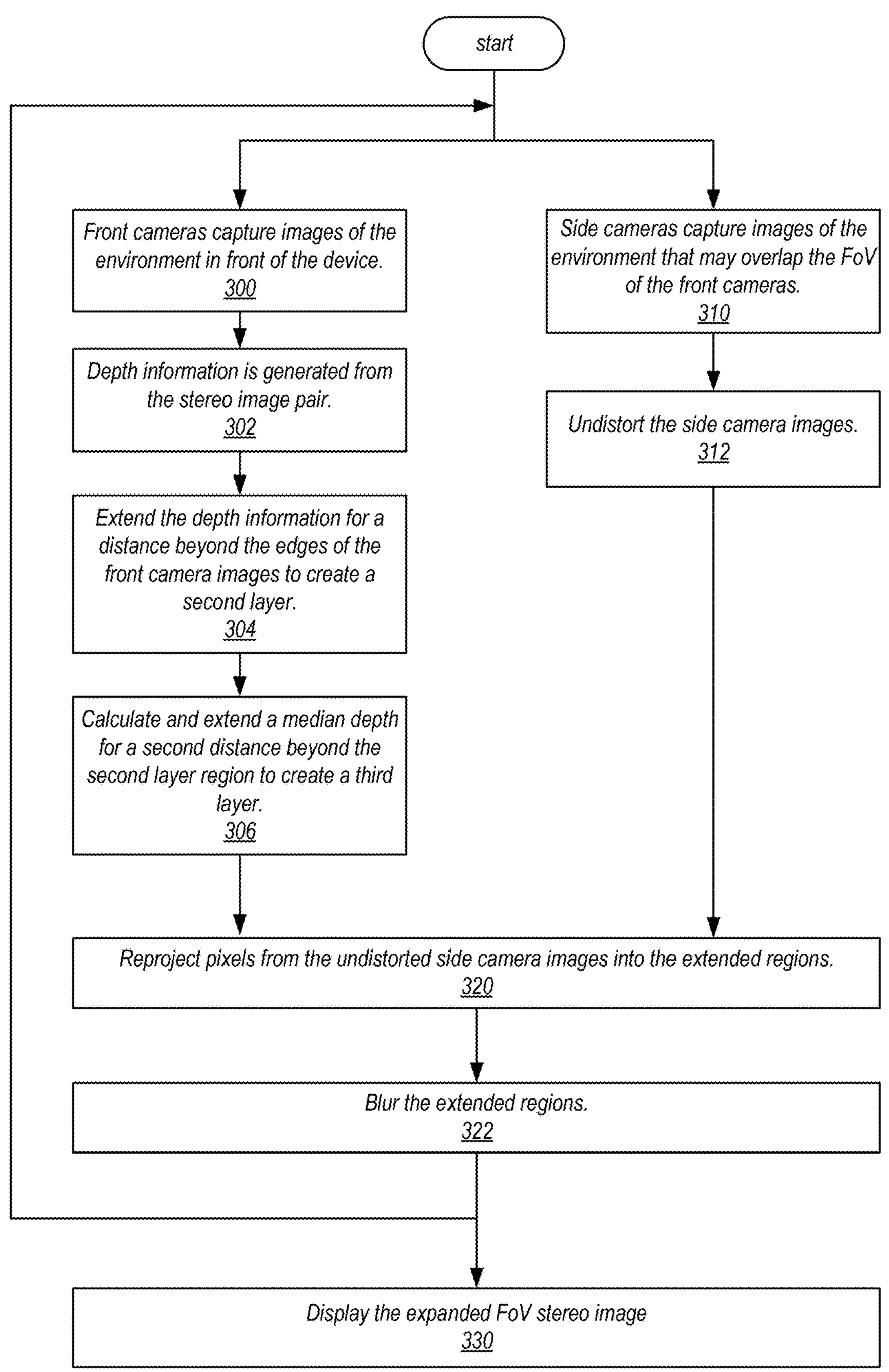
FIG. 3 is a flowchart of a method for generating images with an expanded FOV of an environment from images captured by forward-facing and side-facing cameras, according to some embodiments.

FIG. 3 is a flowchart of a method for generating images with an expanded FOV of an environment from images captured by forward-facing and side-facing cameras, according to some embodiments. Note that at least some portions of this method may be performed in parallel, for example by one or more processors as illustrated in FIG. 2.

As indicated at 300, front cameras of a device capture images of the environment in front of the device. As indicated at 302, depth information is generated from the stereo image pair. In some embodiments, this depth information may be sparse, wireframe depth information. However, in some embodiments, denser depth information may be generated and used. In some embodiments, the depth information may at least in part be determined from input of depth sensing technology of the device. As indicated at 304, the depth information is extended for a first distance beyond the edges of the front camera images to create a second layer. The first distance may be preset or may be dynamically determined based on the content of the images. As indicated at 306, a median depth may be calculated and extended for a second distance beyond the second layer region to create a third layer. The second distance may be preset or may be dynamically determined based on the content of the images. Elements 304 and 306 may be performed independently for the left and right front camera images.

As indicated at 310, side cameras capture images of the environment to the sides of device; these images may overlap the FoV of the respective front camera images. The side cameras may each be wide FoV cameras, and may be grayscale or color cameras. There may be one or more side cameras on each side of the device. As indicated at 310, the side camera images are undistorted to at least partially correct radial distortion so that depth in the side camera the images more closely corresponds to depth in the front camera images.

The relative position of the side cameras with respect to the front cameras may be known, or may be determined using an image processing technique that compares the side camera images to the front camera images. Using this position information, pixel information (color, texture, etc.) from the side camera images may be reprojected to respective pixels in the second and third layers. As indicated at 320, pixel data from the undistorted side camera images is reprojected into the extended regions. As indicated at 322, the extended regions may be blurred. Note that in some embodiments blurring may not be performed. As indicated at 330, the expanded images may then be provided to a display panel for display as an expanded stereo image. As indicated by the arrow returning from element 322 to the start, this may be a continuous method. However, in some embodiments, at least part of the method may only be performed if movement of the device with respect to the environment is detected.

Figure 4:
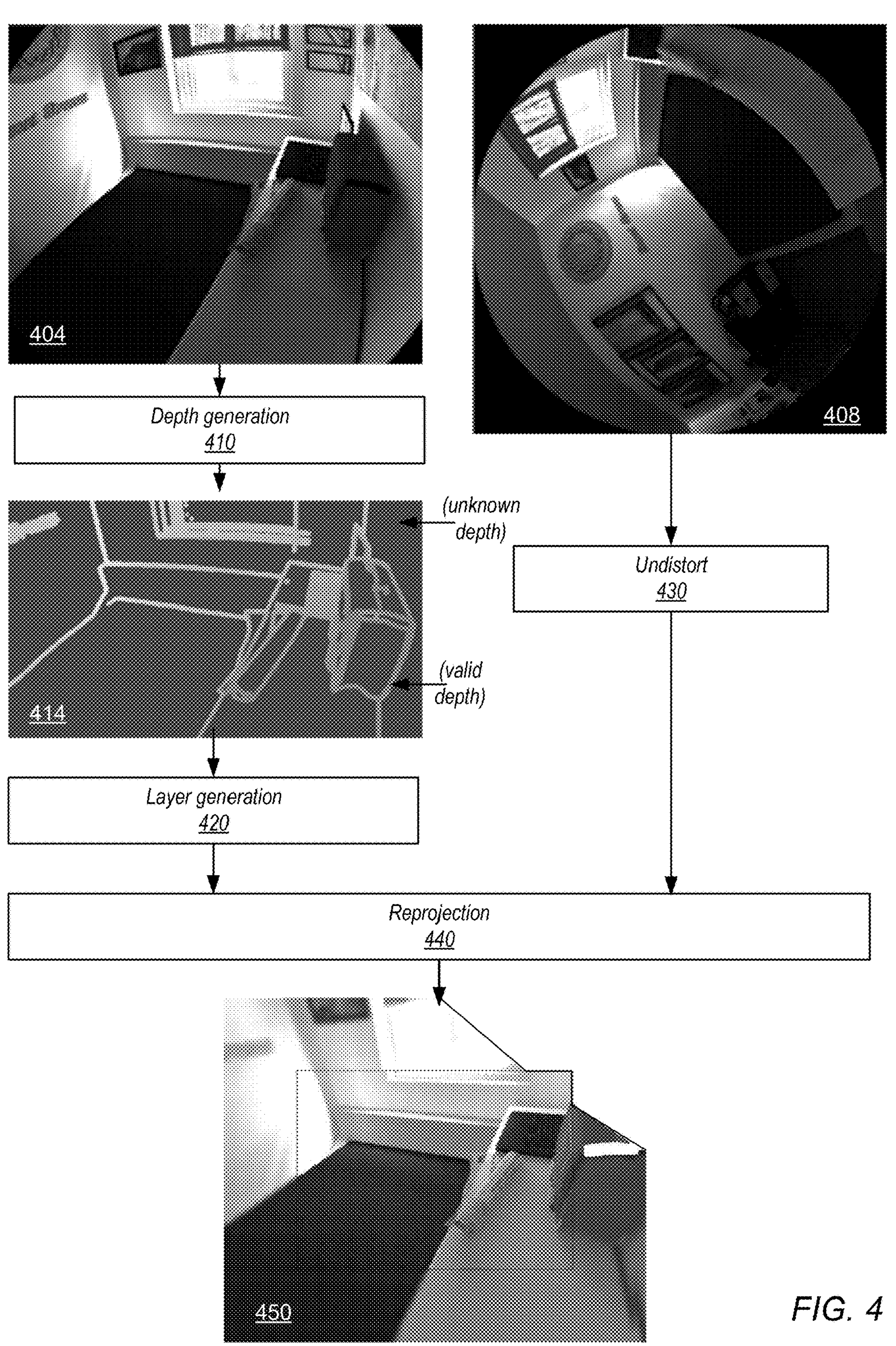
FIG. 4 graphically illustrates a method for generating images with an expanded FoV of an environment from images captured by forward-facing and side-facing cameras, according to some embodiments.

FIG. 4 graphically illustrates a method for generating images with an expanded FoV of an environment from images captured by forward-facing and side-facing cameras, according to some embodiments. Depth information 414 is generated 410 from a front camera image 404 (a first layer). In some embodiments, depth information 414 may be sparse, wireframe depth information. However, in some embodiments, denser depth information 414 may be generated and used. In this example, depth information 414 is shown as sparse or "wireframe" depth information that essentially maps depth at edges in image 404. The darker regions represent areas of unknown depth; the lighter lines are the "wireframes" that represent known depth. At 420, a second layer is generated by extending depth information 414 outward from one or more edges of image 404 for a determined first distance, and a third layer is generated by extending a median depth out for a second distance from the edges of the second layer.

Potentially in parallel to 410 and 420, a side camera image 408 is undistorted at 430. Pixel information from the undistorted image 408 is then reprojected into the second and third layers to generate an image 450 with an expanded FoV. The expanded region may be blurred. The rectangle in image 450 represents the front camera image 404, and is unaffected by the reprojection and blur. The area around the rectangle represents the expanded region comprising the second and third layers. Note that edges from the front camera image 404 extend into the expanded region and are more or less aligned with the edges in image 404, and that the expanded region has been blurred. Also note that a portion at the upper right has not been filled (the expanded region may be an irregular shape rather than a rectangle). This image 450 may represent the left image of a stereo pair; a similar method may be applied to right front and side images to generate a right image of the stereo pair.

Figure 5:
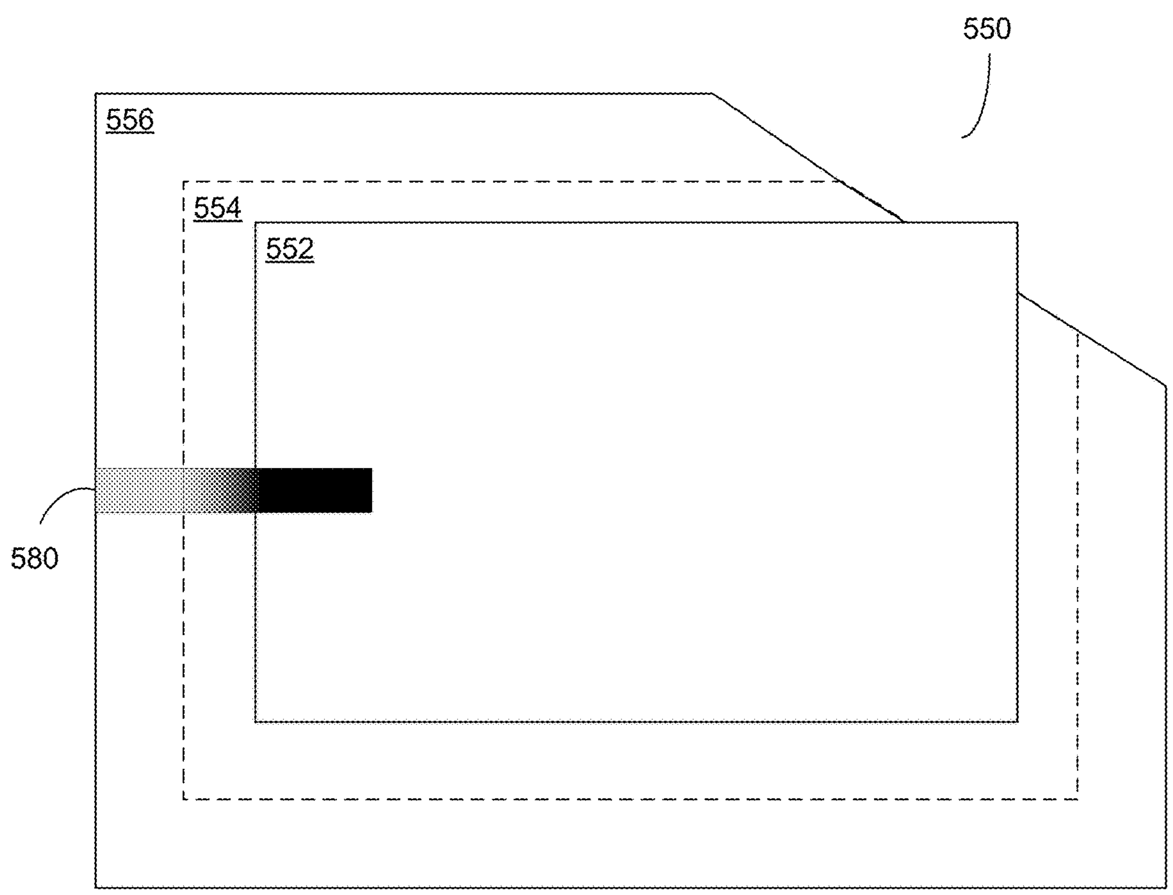
FIG. 5 graphically illustrates an image with an expanded FoV, according to some embodiments.

FIG. 5 graphically illustrates an image 550 with an expanded FoV, according to some embodiments. Bar 580 graphically represents depth information. Region 552 represents the original front camera image and is a first layer. Region 554 represents a second layer in which depth information 580 from the edges of region 552 is extended. Region 556 represents a third layer in which a median depth is set. Note that the expanded regions 554 and 556 may be irregular shapes rather than rectangles. This image 550 may represent the left image of a stereo pair; a similar method may be applied to right front and side images to generate a "mirror" right image of the stereo pair.

In some embodiments, extending depth information 580 from the edges of region 552 may be viewed as an inpainting step, theoretically performed outwards from the center of the sparse depth map. The outward extension of depth information into region 554 is basically an extrapolation or extended inpainting step in which depth information from the edges of the depth map is propagated outwards row and column wise away from the center of the depth map. This provides at least sparse depth cues in region 554, as the depth at the edges in the depth map are propagated into the region 554. The distance that the depth information is propagated may be dynamically determined based at least in part on the content of the region 552, and represents a distance in rows and columns around region 552 that the algorithm determines is acceptable to propagate the sparse depth information by means of inpainting. In some embodiments, a "flat" depth may be extended from the edges of the region 552. However, in some embodiments, slope of the depth at or near the edges of the region 552 may be estimated, and the depth may be extended continuing at the estimated slope.

Figure 6A:
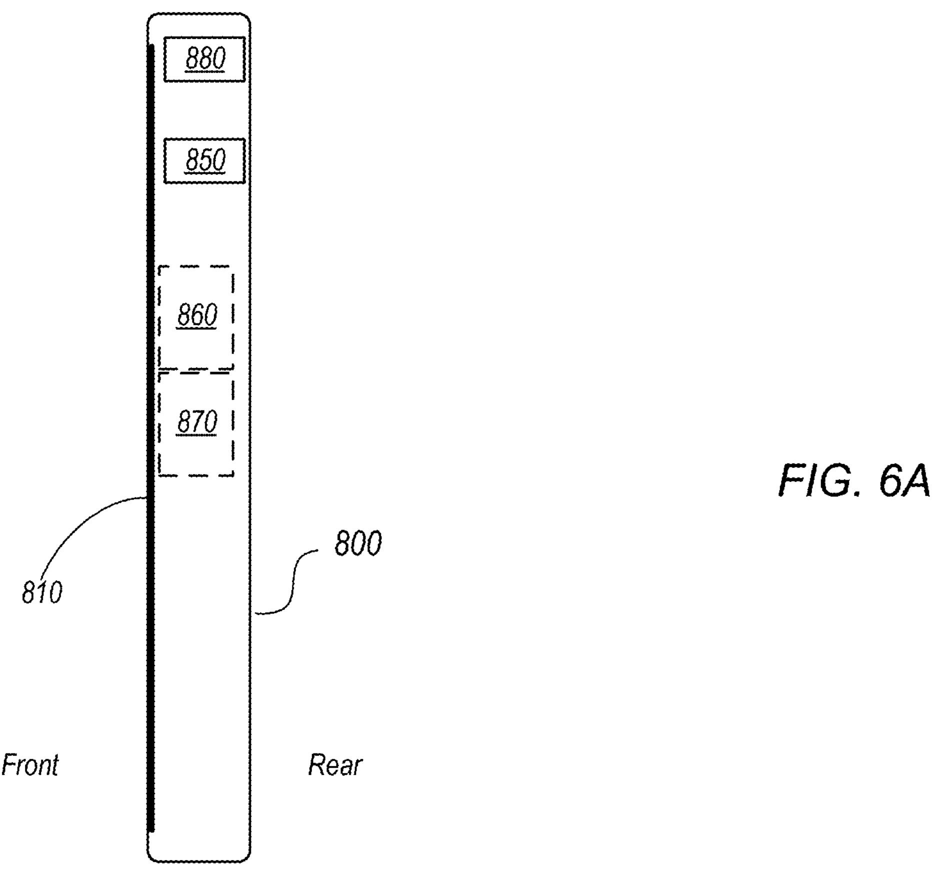
FIGS. 6A and 6B are block diagrams illustrating a device, according to some embodiments.
Figure 6B:
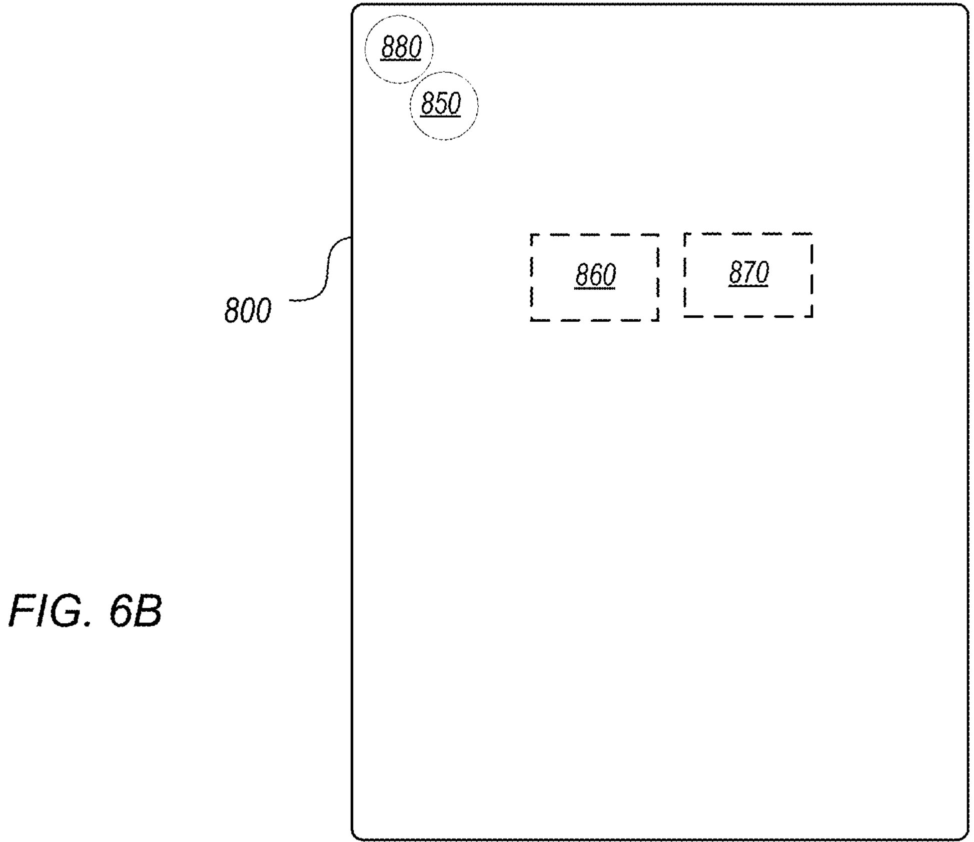

An example application of the methods and apparatus as described herein is in handheld devices such as smartphone, pad or tablet devices, and portable computing devices such as notebook computers. Front- and side-facing cameras may be attached to or integrated in the device, and the device may be carried or moved by a user in an indoor environment such as a room, or in outdoor environments. The images or video captured by the cameras may be processed as described in reference to FIGS. 1A through 5 to generate expanded FoV images on the device, or on another device. FIGS. 6A and 6B illustrate a handheld device, according to some embodiments.

Figure 7A:
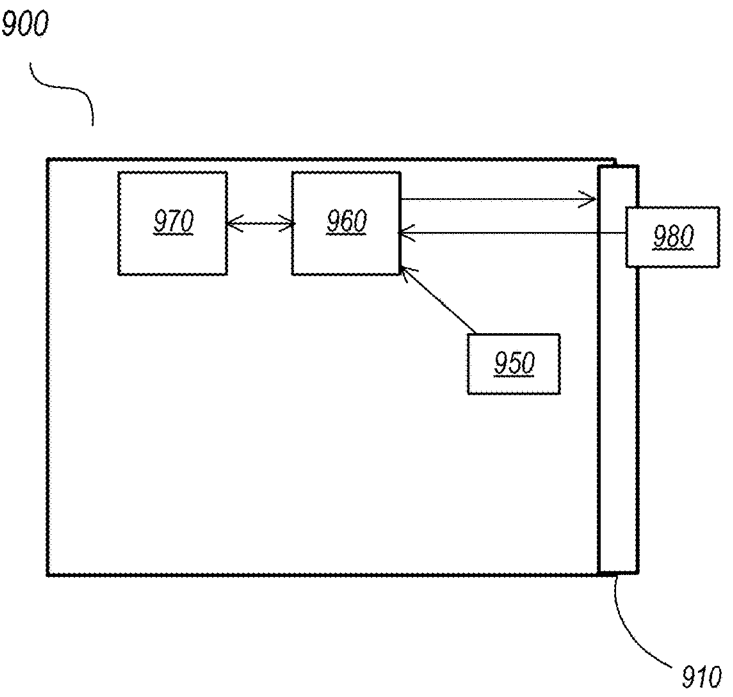
FIGS. 7A and 7B are block diagrams illustrating another device, according to some embodiments.
Figure 7B:
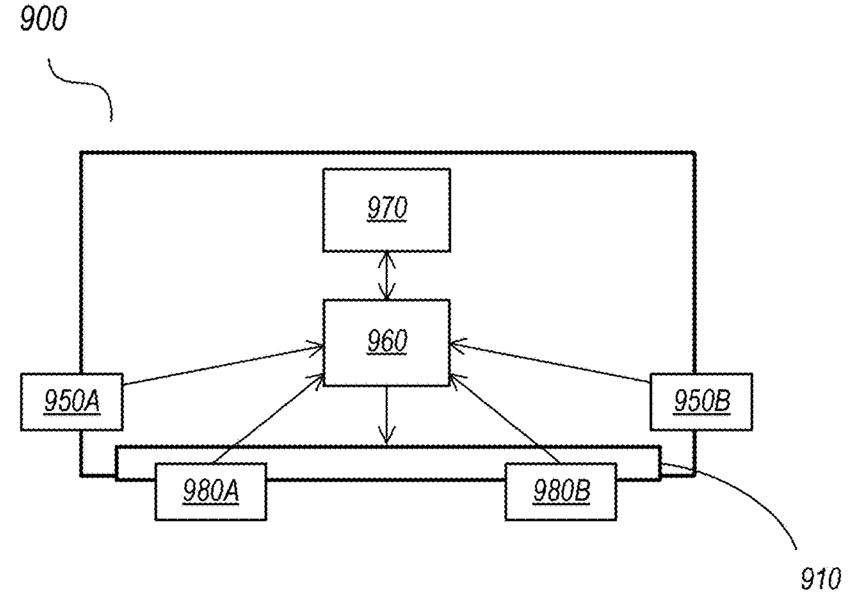

Another example application of the methods and apparatus as described herein is in wearable or head-mounted devices such as devices used in extended reality (XR) systems. An XR system may include a wearable device such as a headset, helmet, goggles, or glasses (referred to herein as a head-mounted device (HMD)). An HMD may include a display on which XR content is displayed for viewing by the user. Front- and side-facing cameras may be attached to or integrated in the device, and the device may be worn by a user in an indoor environment such as a room, or in outdoor environments. The images or video captured by the cameras may be processed as described in reference to FIGS. 1A through 5 to generate expanded FoV images for display on the device. FIGS. 7A and 7B illustrate an example HMD, according to some embodiments.

Another example application of the methods and apparatus as described herein is in drones. A drone may include one or more cameras that provide a forward view, as well as one or more cameras that are used for other purposes such as location detection and navigation. Images or video from the drone may be transmitted to a control station or controlling device that includes a display Rather than just showing a limited FoV from one or more front-facing cameras, the view can be expanded using images or video captured by the other cameras and methods for expanding the FoV as described herein.

Time-Dependent Field of View Extension

In some embodiments, motion or "jitter" of the user's head or the device may be used to collect data over time that can be used in expanding the FoV. In other words, the multiple camera positions may act as a synthetic aperture over time to provide more detailed information for the scene. For example, motion of the front and/or side cameras may be used to collect image data over time, and the collected image data be used to increase or enhance the depth information that is extended into the expanded region to provide a more normal appearance.

Example Devices

FIGS. 6A and 6B are block diagrams illustrating a device that may implement the methods and apparatus as illustrated in FIGS. 1A through 5, according to some embodiments. An example application of the methods and apparatus for providing expanded FoV images as described herein is in a handheld device 800 such as smartphone, pad, or tablet, or a portable device such as a notebook computer. FIG. 6A shows a side view of an example device 800, and FIG. 6B shows an example top view of the example device 800. Device 800 may include, but is not limited to, a display panel or screen 810 located on a "front" of the device 800, a controller 860 comprising one or more processors, memory 870, pose, motion, depth, and orientation sensors (not shown), and cameras including one or more primary, relatively narrow FOV cameras 880 and one or more secondary, wider FoV cameras 850 facing the environment on a "back" side of the device 800. The device 800 may be moved by the user in an environment such as a room or an outdoors environment. The images or video captured by the primary camera(s) 880 may be augmented by images or video captured by the secondary camera(s) 850 as described in reference to FIGS. 1A through 5 to generate expanded FoV images for display by the device 800, or for display on another device.

Note that device 800 as illustrated in FIGS. 6A and 6B is given by way of example, and is not intended to be limiting. In various embodiments, the shape, size, and other features of a device 800 may differ, and the locations, numbers, types, and other features of the components of a device 800 may vary.

FIGS. 7A and 7B are block diagrams illustrating another device that may include or be attached to a steerable receiver as illustrated in FIGS. 1A through 5, according to some embodiments. FIG. 7A shows a side view of an example device 900, and FIG. 7B shows a top view of the example device 900. Note that device 900 as illustrated in FIGS. 7A and 7B is given by way of example, and is not intended to be limiting. In various embodiments, the shape, size, and other features of a device 900 may differ, and the locations, numbers, types, and other features of the components of a device 900 may vary.

Device 900 may include a user-facing display 910. User-facing display 910 may implement any of various types of display technologies. For example, device 900 may include a display system 910 that displays left and right images on screen(s) that are viewed by a subject, such as DLP (digital light processing), LCD (liquid crystal display) and LCoS (liquid crystal on silicon) technology display systems. As another example, display system 910 may be a direct retinal projector system that scans left and right images, pixel by pixel, to the subject's eyes. To scan the images, projectors generate beams that are directed to reflective components that redirect the beams to the user's eyes. In some embodiments, device 900 may be worn on a user's head so that the display 910 is disposed in front of the user's eyes. Thus, device 900 may be a head-mounted device (HMD) with integrated display 910, or alternatively may be a head mounted system configured to accept an external opaque display (e.g., a smartphone).

Device 900 may include one or more world-facing sensors that collect information about the environment (video, depth information, lighting information, location information etc.), and in some embodiments may also include one or more user-facing sensors (not shown) that collect information about the user (e.g., eye or gaze tracking sensors, video of various portions of the user's face). The user-facing sensors may include, but are not limited to one or more eye tracking cameras (e.g., infrared (IR) cameras) that capture views of the user's eyes, one or more cameras (e.g., RGB video cameras) that capture views of various portions of the user's face, and/or sensors that capture depth information for the user's face. The world-facing sensors may include, but are not limited to, one or more front cameras 980 (e.g., visible light RGB video cameras) that capture relatively narrow FoV images of the real-world environment in a field of view in front of the device 900, and one or more "side" cameras 950 that capture relatively wide FoV images of the environment from the sides, bottom, top, or even the front of the device 900. Image data captured by these side cameras may be used for one or more purposes, for example the images may be analyzed as part of a localization process to determine location and distance of the device 900 with respect to other surfaces or objects in the environment. In some embodiments, the world-facing sensors may also include sensors that capture depth information for objects and surfaces in the environment. Device 900 may also include pose, motion, and orientation sensors (not shown).

A controller 960 may be implemented in the device 900, or alternatively may be implemented at least in part by an external device (e.g., a computing system or handheld device such as a smartphone, pad, or tablet) that is communicatively coupled to device 900 via a wired or wireless interface. Controller 960 may include one or more of various types of processors, image signal processors (ISPs), graphics processing units (GPUs), coder/decoders (codecs), system on a chip (SOC), CPUs, and/or other components for processing and rendering information captured by the world-facing sensors, user-facing sensors (if present), and pose, motion, and orientation sensors. Controller 960 may, for example, be configured to render stereo frames that include virtual content based at least in part on the information obtained by the world-facing and user-facing sensors, and may provide the rendered frames to display 910.

Memory 970 may be implemented in the device 900, or alternatively may be implemented at least in part by an external device (e.g., a computing system, smartphone, etc.) that is communicatively coupled to device 900 via a wired or wireless interface. Memory 970 may, for example, be used to record information captured by the sensors, to store program instructions that are executable by the controller 960, and to store data that are used by the controller. Memory 970 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Embodiments of a device 900 as illustrated in FIGS. 7A and 7B may, for example, be used in extended reality (XR) applications to provide augmented or mixed reality views to the user. Device 900 may include one or more sensors that collect information about the environment (video, depth information, lighting information, specular surface information, etc.); the sensors may provide the collected information to controller 960 of the device 900. The sensors may include one or more front-facing visible light cameras (e.g., RGB video cameras) that capture video of the environment that may be used to provide the user with a virtual view of their real environment. In some embodiments, video streams of the real environment captured by the front-facing visible light cameras may be processed by the controller 960 of the device 900 to render augmented or mixed reality frames that include virtual content overlaid on the view of the real environment based at least in part on generated 3D mapping information, and the rendered frames may be provided to display 910. In some embodiments, video or images captured by one or more secondary or side cameras 950 may be used to provide an expanded FOV for the frames generated from the images captured by the front-facing cameras 980 using a method as described herein with reference to FIGS. 1A through 5.

As another example, embodiments of a device 900 as illustrated in FIGS. 7A and 7B may be used in virtual reality (VR) applications to provide virtual reality views to the user. A VR application allows users to experience and/or interact with an immersive artificial environment, such that the user feels as if they were physically in that environment. In some embodiments, the controller 960 of the device 900 may render virtual reality frames based at least in part on generated 3D mapping information, and the rendered frames may be provided to display 910.

Device 900 may, for example, be a head-mounted device (HMD)) such as an HMD used in extended reality (XR) systems. In some embodiments, an HMD may include a clear user-facing display 910 (e.g., glass or plastic lenses) through which the user views the real environment and via which virtual content is overlaid on the user's view of the environment via a projection system. Alternatively, in some embodiments, an HMD may include an opaque user-facing display 910 on which XR content is displayed for viewing by the user. As another alternative, a head mounted system may be configured to accept an external opaque display (e.g., a smartphone).

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The following clauses describe example embodiments consistent with the drawings and the above description.

Clause 1. A system, comprising:

one or more primary cameras configured to capture one or more first images of an environment;

one or more secondary cameras configured to capture one or more second images of the environment from different viewpoints than the one or more primary cameras; and one or more processors configured to:

determine depth information for the one or more first images;

extend the depth information outward from one or more edges of the one or more first images to generate an expanded region; and reproject pixel data from the one or more second images into the expanded region to generate an expanded field of view (FoV) image of a scene in the environment.

Clause 2. The system as recited in clause 1, wherein, to extend the depth information outward from one or more edges of the one or more first images to generate an expanded region, the one or more processors are configured to:

extend the depth information outward from the one or more edges of the one or more first images for a first distance to generate a second layer, wherein the one or more first images are a first layer; and extend a median depth determined from the depth information outward from one or more edges of the second layer for a second distance to generate a second layer.

Clause 3. The system as recited in clause 2, wherein the first and second distances are dynamically determined from content of the one or more first images.

Clause 4. The system as recited in clause 2, wherein, to extend the depth information outward from the one or more edges of the one or more first images for a first distance to generate a second layer, wherein the one or more first images are a first layer, the depth information is extended in an inpainting step in which depth information from the edges of the depth map is propagated outwards row and column wise away from the center of the depth map.

Clause 5. The system as recited in clause 1, wherein the one or more processors are configured to undistort the one or more second images prior to said reproject.

Clause 6. The system as recited in clause 1, wherein the one or more processors are configured to blur the extended region.

Clause 7. The system as recited in clause 1, wherein the one or more primary cameras include two front-facing cameras on a device that provide stereo images of the scene, and wherein the one or more secondary cameras include at least one camera on at least two sides of the device.

Clause 8. The system as recited in clause 7, wherein the device is a head-mounted device (HMD), and wherein the one or more processors are configured to provide the expanded FoV image to a display panel of the HMD for display to a user.

Clause 9. The system as recited in clause 7, wherein the cameras on the at least two sides of the device include wider FoV cameras than the two front-facing cameras.

Clause 10. The system as recited in clause 7, wherein the images captured by at least one camera on a first side of the device are used to extend the FoV of a first one of the two front-facing cameras, and wherein the images captured by at least one camera on a second side of the device are used to extend the FoV of a second one of the two front-facing cameras.

Clause 11. The system as recited in clause 1, wherein the depth information is sparse depth information that provides depth for edges in a scene captured by the one or more primary cameras.

Clause 12. The system as recited in clause 1, wherein the one or more secondary cameras include grayscale cameras, and wherein the one or more processors are further configured to extend color from images captured by the one or more primary colors into the expanded region.

Clause 13. A method, comprising:

capturing, by one or more primary cameras, one or more first images of an environment;

capturing, by one or more secondary cameras, one or more second images of the environment from different viewpoints than the one or more primary cameras; and performing, by one or more processors:

determining depth information for the one or more first images;

extending the depth information outward from one or more edges of the one or more first images to generate an expanded region; and reprojecting pixel data from the one or more second images into the expanded region to generate an expanded field of view (FoV) image of a scene in the environment.

Clause 14. The method as recited in clause 13, wherein extending the depth information outward from one or more edges of the one or more first images to generate an expanded region comprises:

extending the depth information outward from the one or more edges of the one or more first images for a first distance; and extending a median depth determined from the depth information outward from one or more edges of the second layer for a second distance.

Clause 15. The method as recited in clause 14, further comprising dynamically determining the first and second distances from content of the one or more first images.

Clause 16. The method as recited in clause 13, further comprising undistorting the one or more second images prior to said reprojecting.

Clause 17. The method as recited in clause 13, further comprising blurring the extended region.

Clause 18. The method as recited in clause 13, wherein the one or more primary cameras include two front-facing cameras on a device that provide stereo images of the scene, and wherein the one or more secondary cameras include at least one camera on at least two sides of the device.

Clause 19. The method as recited in clause 18, wherein the device is a head-mounted device (HMD), and wherein the one or more processors are configured to provide the expanded FoV image to a display screen of the HMD for display to a user.

Clause 20. The method as recited in clause 18, wherein the cameras on the at least two sides of the device include wider FOV cameras than the two front-facing cameras.

Clause 21. The method as recited in clause 18, wherein reprojecting pixel data from the one or more second images into the expanded region to generate an expanded field of view (FoV) image of a scene in the environment comprises:

reprojecting pixel data from the images captured by at least one camera on a first side of the device into an expanded region around an image captured by a first one of the two front-facing cameras; and reprojecting pixel data from the images captured by at least one camera on a second side of the device into an expanded region around an image captured by a second one of the two front-facing cameras.

Clause 22. The method as recited in clause 13, wherein the depth information is sparse depth information that provides depth for edges in a scene captured by the one or more primary cameras.

Clause 23. The method as recited in clause 13, wherein the one or more secondary cameras include grayscale cameras, the method further comprising extending color from images captured by the one or more primary colors into the expanded region.

Clause 24. A device, comprising:

two front-facing cameras configured to capture stereo images of a scene in an environment;

at least one camera on at least two sides of the device configured to capture additional images of the scene; and one or more processors configured to render expanded field of view (FoV) stereo images of the scene, wherein, to render the expanded FOV stereo images, the one or more processors are configured to:

determine depth information for the stereo images captured by the front-facing cameras;

extend the depth information outward from the one or more edges of each of the stereo images for a first distance to generate a second layer, wherein the stereo images are a first layer;

extend a median depth determined from the depth information outward from one or more edges of the second layer for a second distance to generate a third layer;

reproject pixel data from the images captured by at least one camera on a first side of the device into the second and third layers around an image captured by a first one of the two front-facing cameras; and reproject pixel data from the images captured by at least one camera on a second side of the device into the second and third layers around an image captured by a second one of the two front-facing cameras.

Clause 25. The device as recited in clause 24, wherein the first and second distances are dynamically determined from content of the stereo images captured by the front-facing cameras.

Clause 26. The device as recited in clause 24, wherein the one or more processors are configured to undistort the additional images of the scene prior to said reproject.

Clause 27. The device as recited in clause 24, wherein the one or more processors are configured to blur the second and third layers in the expanded FoV stereo images.

Clause 28. The device as recited in clause 24, wherein the device is a head-mounted device (HMD), and wherein the one or more processors are configured to provide the expanded FoV stereo images to a display panel of the HMD for display to a user.

Clause 29. The device as recited in clause 24, wherein the depth information is sparse depth information that provides depth for edges in a scene captured by the front-facing cameras.

Clause 30. The device as recited in clause 24, wherein the additional images include grayscale images, and wherein the one or more processors are further configured to extend color from the stereo images into the second and third layers around the stereo images.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

one or more primary cameras configured to capture one or more first images of an environment;

one or more secondary cameras configured to capture one or more second images of the environment from different viewpoints than the one or more primary cameras; and one or more processors configured to:

determine depth information for the one or more first images;

extend the depth information outward from one or more edges of the one or more first images to generate an expanded region; and reproject pixel data from the one or more second images into the expanded region to generate an expanded field of view (FoV) image of a scene in the environment.

2. The system as recited in claim 1, wherein, to extend the depth information outward from one or more edges of the one or more first images to generate an expanded region, the one or more processors are configured to:

extend the depth information outward from the one or more edges of the one or more first images for a first distance to generate a second layer, wherein the one or more first images are a first layer; and extend a median depth determined from the depth information outward from one or more edges of the second layer for a second distance to generate a second layer.

3. The system as recited in claim 2, wherein the first and second distances are dynamically determined from content of the one or more first images.

4. The system as recited in claim 2, wherein, to extend the depth information outward from the one or more edges of the one or more first images for a first distance to generate a second layer, wherein the one or more first images are a first layer, the depth information is extended in an inpainting step in which depth information from edges of a depth map is propagated outwards row and column wise away from a center of the depth map.

5. The system as recited in claim 1, wherein the one or more processors are configured to undistort the one or more second images prior to said reproject.

6. The system as recited in claim 1, wherein the one or more processors are configured to blur the expanded region.

7. The system as recited in claim 1, wherein the one or more primary cameras include two front-facing cameras on a device that provide stereo images of the scene, and wherein the one or more secondary cameras include at least one camera on at least two sides of the device.

8. The system as recited in claim 7, wherein the device is a head-mounted device (HMD), and wherein the one or more processors are configured to provide the expanded FoV image to a display panel of the HMD for display to a user.

9. The system as recited in claim 7, wherein the cameras on the at least two sides of the device include wider FOV cameras than the two front-facing cameras.

10. The system as recited in claim 7, wherein the images captured by at least one camera on a first side of the device are used to extend the FoV of a first one of the two front-facing cameras, and wherein the images captured by at least one camera on a second side of the device are used to extend the FoV of a second one of the two front-facing cameras.

11. The system as recited in claim 1, wherein the depth information is sparse depth information that provides depth for edges in a scene captured by the one or more primary cameras.

12. The system as recited in claim 1, wherein the one or more secondary cameras include grayscale cameras, and wherein the one or more processors are further configured to extend color from images captured by the one or more primary colors into the expanded region.

13. A method, comprising:

capturing, by one or more primary cameras, one or more first images of an environment;

capturing, by one or more secondary cameras, one or more second images of the environment from different viewpoints than the one or more primary cameras; and performing, by one or more processors:

determining depth information for the one or more first images;

extending the depth information outward from one or more edges of the one or more first images to generate an expanded region; and reprojecting pixel data from the one or more second images into the expanded region to generate an expanded field of view (FoV) image of a scene in the environment.

14. The method as recited in claim 13, wherein extending the depth information outward from one or more edges of the one or more first images to generate an expanded region comprises:

extending the depth information outward from the one or more edges of the one or more first images for a first distance; and extending a median depth determined from the depth information outward from one or more edges of a second layer for a second distance.

15. The method as recited in claim 14, further comprising dynamically determining the first and second distances from content of the one or more first images.

16. The method as recited in claim 13, further comprising undistorting the one or more second images prior to said reprojecting.

17. The method as recited in claim 13, further comprising blurring the expanded region.

18. The method as recited in claim 13, wherein the one or more primary cameras include two front-facing cameras on a device that provide stereo images of the scene, and wherein the one or more secondary cameras include at least one camera on at least two sides of the device.

19. The method as recited in claim 18, wherein reprojecting pixel data from the one or more second images into the expanded region to generate an expanded field of view (FoV) image of a scene in the environment comprises:

reprojecting pixel data from the images captured by at least one camera on a first side of the device into an expanded region around an image captured by a first one of the two front-facing cameras; and reprojecting pixel data from the images captured by at least one camera on a second side of the device into an expanded region around an image captured by a second one of the two front-facing cameras.

20. A device, comprising:

two front-facing cameras configured to capture stereo images of a scene in an environment;

at least one camera on at least two sides of the device configured to capture additional images of the scene; and one or more processors configured to render expanded field of view (FoV) stereo images of the scene, wherein, to render the expanded FoV stereo images, the one or more processors are configured to:

determine depth information for the stereo images captured by the front-facing cameras;

extend the depth information outward from the one or more edges of each of the stereo images for a first distance to generate a second layer, wherein the stereo images are a first layer;

extend a median depth determined from the depth information outward from one or more edges of the second layer for a second distance to generate a third layer;

reproject pixel data from the images captured by at least one camera on a first side of the device into the second and third layers around an image captured by a first one of the two front-facing cameras; and reproject pixel data from the images captured by at least one camera on a second side of the device into the second and third layers around an image captured by a second one of the two front-facing cameras.

* * * * *